United States Patent
Classen et al.

(10) Patent No.: US 9,291,455 B2
(45) Date of Patent: Mar. 22, 2016

(54) METHOD FOR OPERATING AND/OR FOR MEASURING A MICROMECHANICAL DEVICE, AND MICROMECHANICAL DEVICE

(71) Applicants: Johannes Classen, Reutlingen (DE); Christoph Gauger, Geislingen Bei Balingen (DE); Patrick Wellner, Walddorfhaeslach (DE)

(72) Inventors: Johannes Classen, Reutlingen (DE); Christoph Gauger, Geislingen Bei Balingen (DE); Patrick Wellner, Walddorfhaeslach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 343 days.

(21) Appl. No.: 13/918,556

(22) Filed: Jun. 14, 2013

(65) Prior Publication Data
US 2013/0333469 A1 Dec. 19, 2013

(30) Foreign Application Priority Data
Jun. 15, 2012 (DE) .......................... 10 2012 210 144

(51) Int. Cl.
*G01C 19/56* (2012.01)
*G01C 19/5719* (2012.01)
*G01C 19/5747* (2012.01)
*G01C 19/574* (2012.01)

(52) U.S. Cl.
CPC .............. *G01C 19/56* (2013.01); *G01C 19/574* (2013.01); *G01C 19/5719* (2013.01); *G01C 19/5747* (2013.01)

(58) Field of Classification Search
CPC .. G01C 19/56; G01C 19/564; G01C 19/5719; G01C 19/5747; G01C 19/5726; G01C 19/574

USPC ................ 73/504.12, 504.14, 504.02, 504.04
See application file for complete search history.

(56) References Cited

U.S. PATENT DOCUMENTS

| | | | |
|---|---|---|---|
| 5,025,346 A | 6/1991 | Tang et al. | |
| 6,843,127 B1 * | 1/2005 | Chiou | 73/504.12 |
| 6,993,969 B2 * | 2/2006 | Higuchi | 73/504.14 |
| 2005/0166675 A1 * | 8/2005 | Hobbs et al. | 73/504.12 |
| 2010/0139399 A1 * | 6/2010 | Geiger et al. | 73/504.12 |
| 2010/0154543 A1 * | 6/2010 | Diem | 73/504.14 |
| 2010/0186505 A1 * | 7/2010 | Sattler et al. | 73/504.12 |
| 2010/0186506 A1 * | 7/2010 | Robert | 73/504.12 |
| 2010/0186507 A1 * | 7/2010 | Gunthner et al. | 73/504.14 |
| 2010/0192690 A1 * | 8/2010 | Classen et al. | 73/504.12 |
| 2010/0206071 A1 * | 8/2010 | Rocznik | 73/504.12 |
| 2011/0056292 A1 * | 3/2011 | Jomori et al. | 73/504.12 |
| 2011/0132087 A1 * | 6/2011 | Ohms et al. | 73/504.12 |
| 2012/0024059 A1 * | 2/2012 | Classen | 73/504.12 |

* cited by examiner

*Primary Examiner* — Helen Kwok
(74) *Attorney, Agent, or Firm* — Kenyon & Kenyon LLP

(57) ABSTRACT

A method for operating and/or measuring a micromechanical device. The device has a first and second seismic mass which are movable by oscillation relative to a substrate; a first drive device for deflecting the first seismic mass and a second drive device for deflecting the second seismic mass, parallel to a drive direction in a first orientation; a third drive device for deflecting the first seismic mass, and a fourth drive device for deflecting the second seismic mass in parallel to the drive direction and according to a second orientation opposite from the first orientation; a first detection device for detecting drive motion of the first seismic mass; and a second detection device for detecting drive motion of the second seismic mass. A first and a second detection signal are generated by the first and second detection devices, the first detection signal being evaluated separately from the second detection signal.

10 Claims, 5 Drawing Sheets

METHOD FOR OPERATING AND/OR FOR MEASURING A MICROMECHANICAL DEVICE, AND MICROMECHANICAL DEVICE

CROSS REFERENCE

The present application claims the benefit under 35 U.S.C. §119 of German Patent Application No. DE 102012210144.6 filed on Jun. 15, 2012, which is expressly incorporated herein by reference in its entirety.

FIELD

The present invention relates to a method for operating and/or for measuring a micromechanical device and a micromechanical device.

BACKGROUND INFORMATION

Micromechanical devices, in particular micromechanical yaw rate sensors, are generally known which have drive devices in which primarily electrostatic comb finger drives are used. For a precise setting of the working amplitudes, in conventional micromechanical devices it is customary to use driven comb finger structures (so-called drive combs) in order to couple forces into components of the micromechanical devices which are oscillatable, and thus deflectable from a neutral position, as well as to use further comb finger structures, so-called drive detection combs, in order to measure a difference in capacitance, which is used as a control variable for the drive circuit.

For example, a micromechanical device is described in U.S. Pat. No. 5,025,346 which has a carrier substrate and a seismic mass, the carrier substrate and the seismic mass having multiple electrodes, so that the seismic mass is movable relative to the carrier substrate along a direction of motion.

For operating micromechanical devices, in particular yaw rate sensors, a circuit customarily generates periodic voltage curves (sinusoidal or rectangular pulses, for example) which via a capacitive drive structure on the sensor are then converted into periodic drive forces which set portions of the micromechanical devices, in particular those portions which function as a seismic mass, into oscillation.

As yaw rate sensors, sensors are often used which are composed of symmetrical coupled partial oscillators, so that interfering influences may be reduced via differential evaluation principles.

However, manufacturing-related factors may result in asymmetries between the partial oscillators of the micromechanical devices which adversely affect the functionality of the micromechanical devices, in particular the yaw rate sensor.

SUMMARY

An example method according to the present invention for operating and/or for measuring a micromechanical device and the example micromechanical device according to the present invention may have the advantage that information concerning the manufacturing-related asymmetries between the partial oscillators of the micromechanical device may be obtained from an early characterization measurement, so that via suitable screening measures, such micromechanical devices in which such asymmetries between the partial oscillators are particularly great may be sorted out after manufacture. It is thus possible according to the present invention to detect such defective specimens of a set of the micromechanical devices in an early, and thus cost-effective, stage of the system integration, thus making the manufacturing process more cost-effective overall. According to an embodiment of the present invention, it is provided that in a micromechanical device having two partial oscillators, i.e., a first substructure and a second substructure, on the one hand a symmetrical force coupling is achieved (in particular due to the fact that on the one hand the first drive device is in operative connection with the fourth drive device, and on the other hand the second drive device is in operative connection with the third drive device), and on the other hand it is possible to easily ascertain the sensor asymmetry, in particular using a special measuring technique (premeasurement), by an electrical arrangement to obtain information concerning manufacturing-related imperfections of micromechanical devices. According to an example embodiment of the present invention, it is particularly advantageous that the deflection of the partial oscillators, i.e., the first substructure and the second substructure of the micromechanical device, may be measured separately. In particular, it is advantageously possible according to the present invention that for carrying out a measurement of the micromechanical device (i.e., during manufacture or during the characterization/the comparison), the first detection signal is evaluated separately from the second detection signal, and that for operating the micromechanical device, the first detection signal is evaluated together with the second detection signal, in particular in the form of a differential signal of the first and the second detection signals, or of the second and the first detection signals.

Example embodiments and refinements of the present invention are described below with reference to the figures.

According to one preferred refinement of the present invention, it is provided that the first detection device detects solely the drive motion of the first seismic mass, and the second detection device detects solely the drive motion of the second seismic mass. According to the present invention, it is thus possible in a particularly advantageous manner for additional information to be obtained concerning the first and the second seismic masses, in particular concerning asymmetries between the partial oscillators of the micromechanical device and in particular during an early characterization measurement.

According to another preferred refinement of the present invention, it is provided that the first drive device and the first detection device are situated along the drive direction on different sides with respect to the first seismic mass, and the second drive device and the second detection device are situated along the drive direction on different sides with respect to the second seismic mass. According to the present invention, it is thus advantageously possible that on the one hand a symmetrical force coupling may be provided on the two seismic masses, i.e., on the two partial oscillators of the micromechanical device, and that on the other hand the sensor asymmetry may be easily ascertained using a special measuring technique by electrical means in order to obtain information concerning manufacturing-related imperfections of the micromechanical device.

In addition, according to the present invention it is preferably provided that the first seismic mass is connected to a first drive transmission element, and the second seismic mass is connected to a second drive transmission element, the first drive device and the first detection device being situated along the drive direction on different sides with respect to the first drive transmission element, and the second drive device and the second detection device being situated along the drive direction on different sides with respect to the second drive transmission element. In this way as well, according to the present invention it is advantageously possible to easily ascertain a symmetrical force coupling on the one hand, and the sensor asymmetry by an electrical arrangement on the other hand.

In the example micromechanical device, it is also preferred according to the present invention that the micromechanical device is configured in such a way that the first detection device detects solely the drive motion of the first seismic mass, and the second detection device detects solely the drive motion of the second seismic mass. As the result of separating the detection of the motion of the first seismic mass from the detection of the motion of the second seismic mass, the asymmetries in the mechanical design of the micromechanical device may be ascertained in a particularly simple way.

Furthermore, in the micromechanical device it is preferred according to the present invention that the first drive device and the first detection device are situated along the drive direction on different sides with respect to the first seismic mass, and the second drive device and the second detection device are situated along the drive direction on different sides with respect to the second seismic mass.

In addition, it is preferably provided according to the present invention that the first seismic mass is connected to a first drive transmission element, and the second seismic mass is connected to a second drive transmission element, the first drive device and the first detection device being situated along the drive direction on different sides with respect to the first drive transmission element, and the second drive device and the second detection device being situated along the drive direction on different sides with respect to the second drive transmission element.

Furthermore, it is also preferably provided according to the present invention that the first and the second detection signals are detected during a premeasurement of the micromechanical device.

In the micromechanical device, it is further preferred according to the present invention that the micromechanical device is configured in such a way that the first detection device detects solely the drive motion of the first seismic mass, and the second detection device detects solely the drive motion of the second seismic mass.

In addition, it is also preferably provided according to the present invention that the first drive device, the third drive device, and the first detection device are each designed as finger electrodes which together with counter electrodes of the first seismic mass form comb structures, and that the second drive device, the fourth drive device, and the second detection device are each designed as finger electrodes which together with counter electrodes of the second seismic mass form further comb structures.

Exemplary embodiments of the present invention are illustrated in the figures and explained in greater detail below.

DETAILED DESCRIPTION OF EXAMPLE EMBODIMENTS

Figure 1:
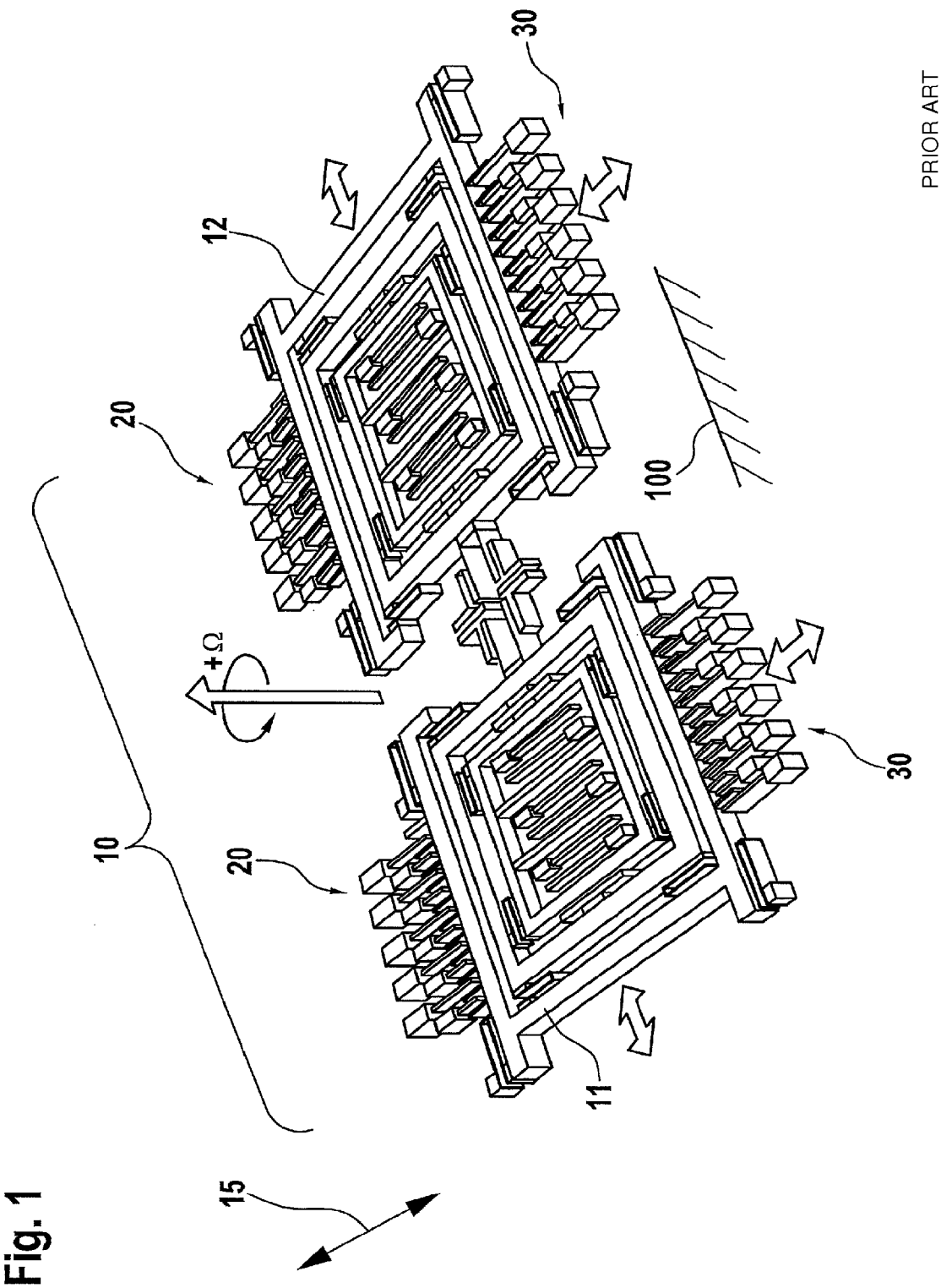
FIG. 1 schematically shows a perspective view of a conventional micromechanical device in the form of a yaw rate sensor.

Identical parts are provided with the same reference numerals in the various figures, and therefore are generally designated or mentioned only once in each case.

FIG. 1 shows one example of a conventional micromechanical device 10. Shown is a micromechanical device 10 as a yaw rate sensor having a first seismic mass 11 and a second seismic mass 12, first seismic mass 11 being implemented as part of a first substructure of micromechanical device 10, and second seismic mass 12 being implemented as part of a second substructure of micromechanical device 10. The substructures are also referred to below as partial oscillators, since first seismic mass 11 and second seismic mass 12 each have a design which is movable, in particular movable by oscillation, with respect to a substrate 100 situated beneath the seismic mass, as schematically shown in FIG. 1.

First seismic mass 11 and second seismic mass 12 are drivable along a drive direction 15 with the aid of drive devices 20. These drive motions of first and second seismic masses 11, 12 are detectable with the aid of detection devices 30.

Figure 2:
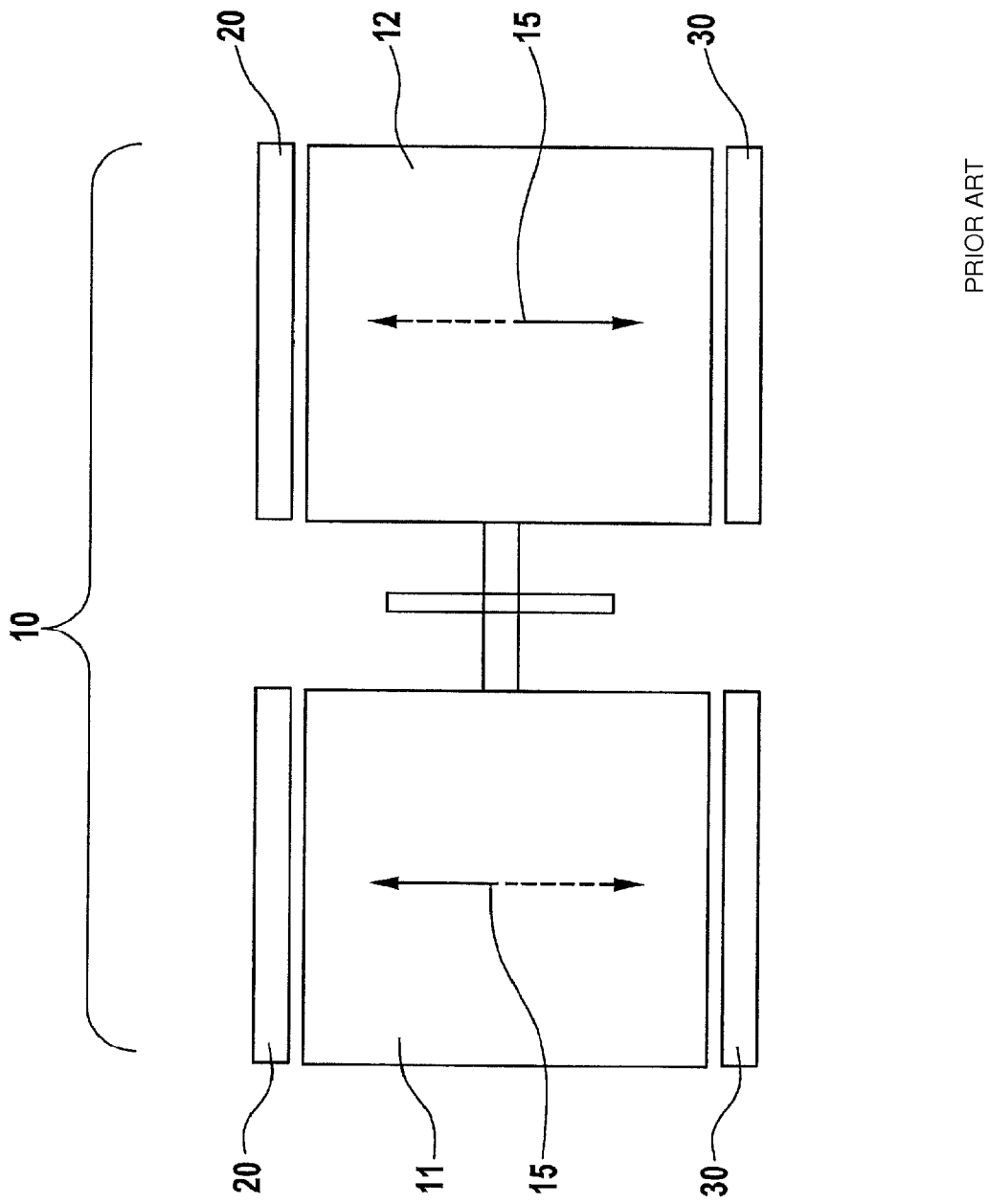
FIG. 2 schematically shows a top view of the micromechanical device according to FIG. 1.

FIG. 2 schematically depicts a top view of a conventional micromechanical device 10, corresponding to the illustration according to FIG. 1. Drive devices 20 are able to drive first and second seismic masses 11, 12 along drive direction 15, an antiparallel oscillation of the first and the second seismic masses preferably being achieved, i.e., first seismic mass 11 going in the positive drive direction at a point in time, corresponding to the illustration in FIG. 2, while second seismic mass 12 is driven in the negative drive direction, i.e., oppositely oriented. In micromechanical device 10 according to FIGS. 1 and 2, it is possible to detect the drive motions of first and second seismic masses 11, 12 with the aid of the detection devices.

Figure 3:
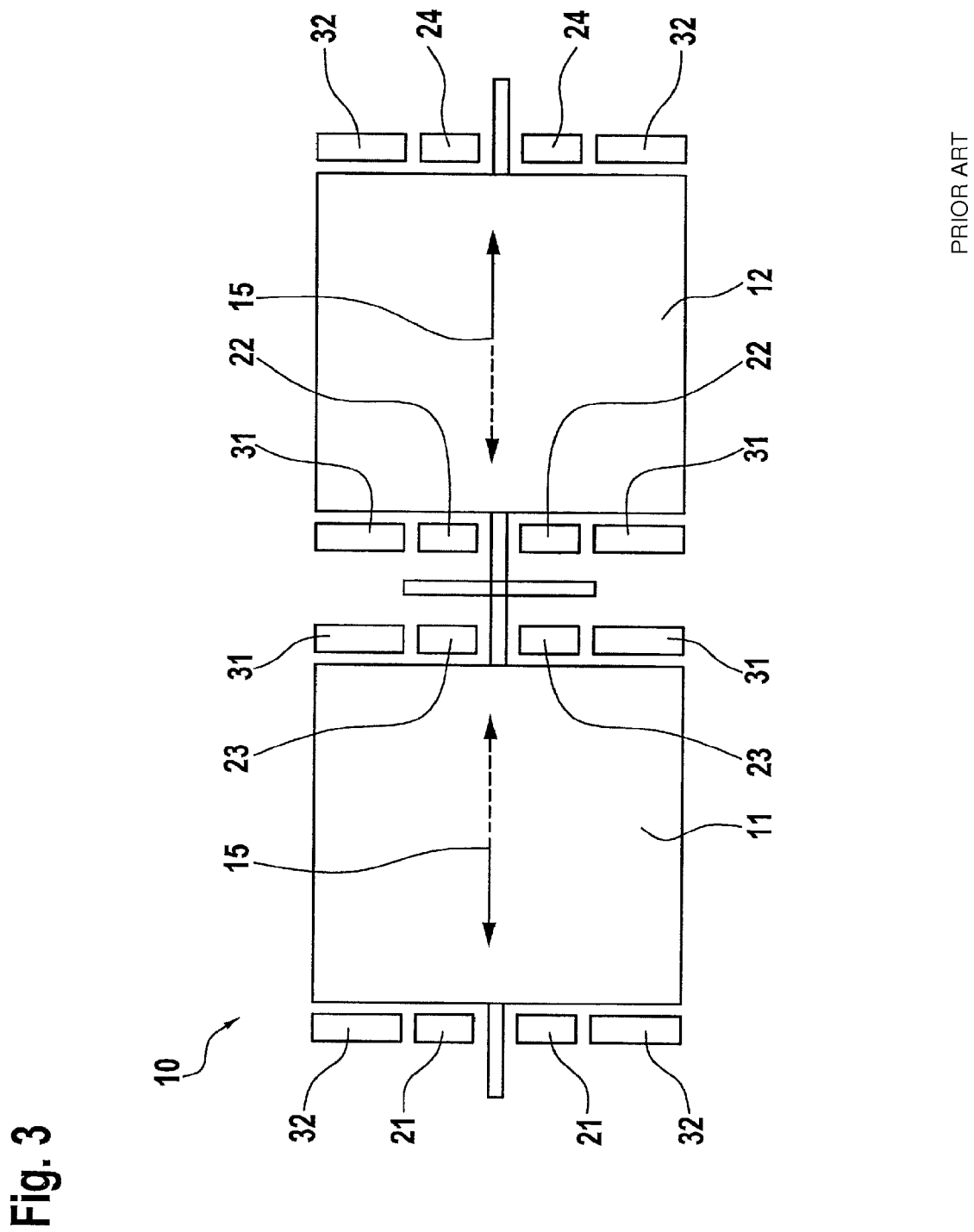
FIG. 3 schematically shows another specific embodiment of a conventional micromechanical device.

FIG. 3 illustrates another example of a conventional micromechanical device 10. A drive of the first and the second seismic masses is implemented (in particular for implementing an antiparallel drive mode), drive forces being exerted on both sides on each of the first and the second seismic masses; i.e., with the aid of a first drive device 21, first seismic mass 11 is driven in the drive direction according to a first orientation, and with the aid of a second drive device 22, second seismic mass 12 is likewise driven in parallel to the drive direction according to the first orientation. With the aid of a third drive device 23, first seismic mass 11 is driven in parallel to drive direction 15 in a second orientation which is opposite from the first orientation. With the aid of a fourth drive device 24, second seismic mass 12 is driven in parallel to drive direction 15 according to the second orientation. According to the symmetrical design of micromechanical device 10 according to FIG. 3, a first detection device 31 is in operative connection with first seismic mass 11 and also with second seismic mass 12, and a second detection device 32 is likewise in operative connection with first seismic mass 11 and also with second seismic mass 12, so that the individual contributions of first and second seismic masses 11, 12 are not separable from one another during the differential evaluation of first and second detection devices 31, 32.

Figure 4:
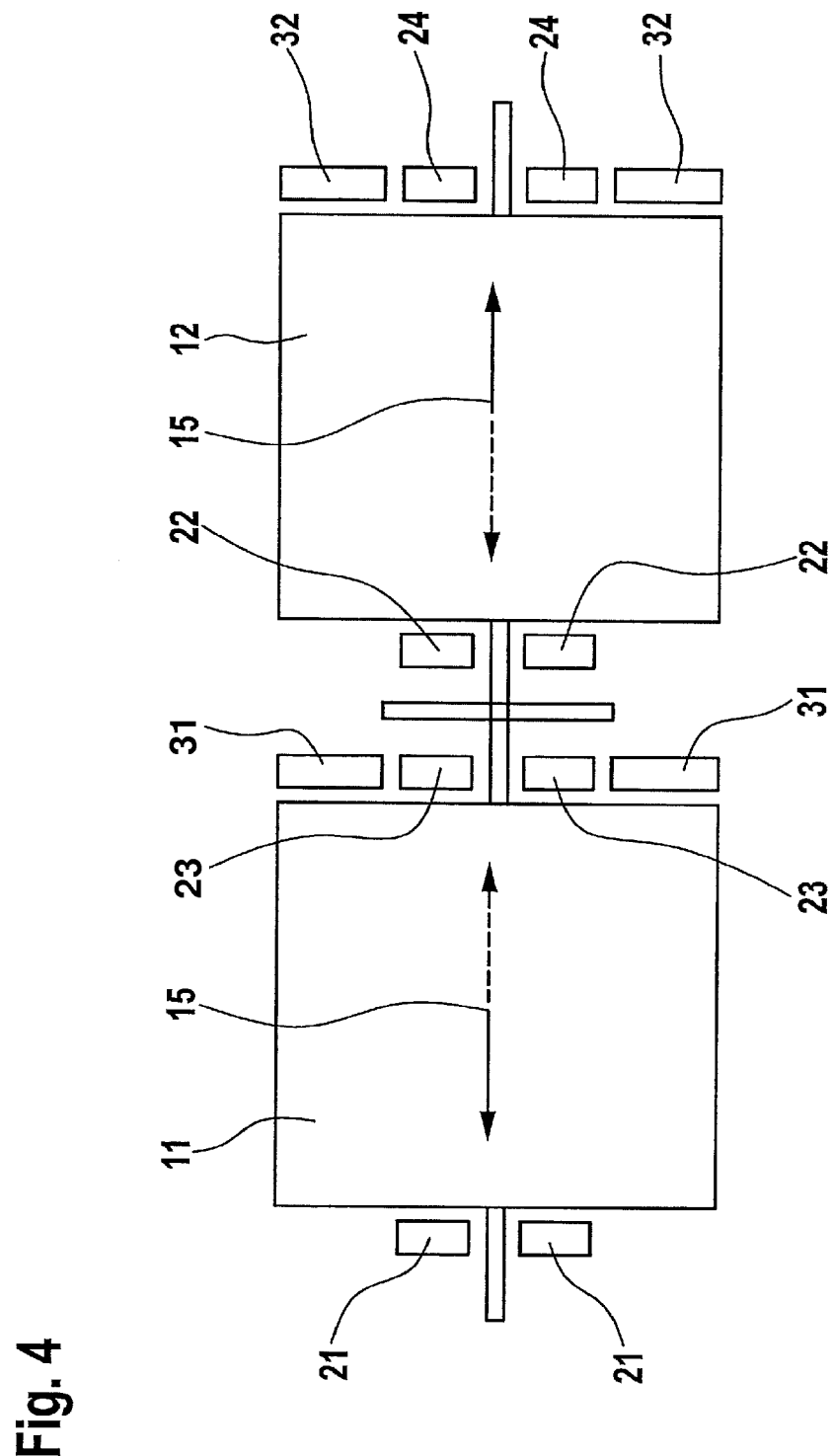
FIG. 4 schematically shows a top view of an example micromechanical device, in particular in the form of a yaw rate sensor according to the present invention.

FIG. 4 illustrates one example of a micromechanical device 10 according to the present invention. A drive of first and second seismic masses 11, 12 (in particular for implementing an antiparallel drive mode) is implemented, drive forces being exerted on both sides on each of first and second seismic masses 11, 12; i.e., with the aid of a first drive device 21, first seismic mass 11 is driven in the drive direction according to a first orientation (to the left in the plane of the drawing in the example in FIG. 4), and with the aid of a second drive device 22, second seismic mass 12 is likewise driven in parallel to the drive direction according to the first orientation (to the left in the plane of the drawing in the example in FIG. 4). With the aid of a third drive device 23, first seismic mass 11 is driven in parallel to drive direction 15 in a second orientation opposite from the first orientation (to the right in the plane of the drawing in the example in FIG. 4). With the aid of a fourth drive device 24, second seismic mass 12 is driven in parallel to the drive direction according to the second orientation (to the right in the plane of the drawing in the example in FIG. 4). According to the present invention of micromechanical device 10, a first detection device 31 is in operative connection only with first seismic mass 11, and a second detection device 32 is in operative connection only with second seismic mass 12, so that the individual contributions of first and second seismic masses 11, 12, with the aid of a suitable evaluation circuit of first and second detection devices 31, 32, are separate from one another, and are separately evaluatable and assessable. With this electrode arrangement, the information concerning the deflection of each partial oscillator of micromechanical device 10 or of each of seismic masses 11, 12 is separately accessible, while the drive has maximum symmetry due to the arrangement of the drives on both sides, which is particularly important for suppressing interfering 1$f$ motions due to levitation forces.

Figure 5:
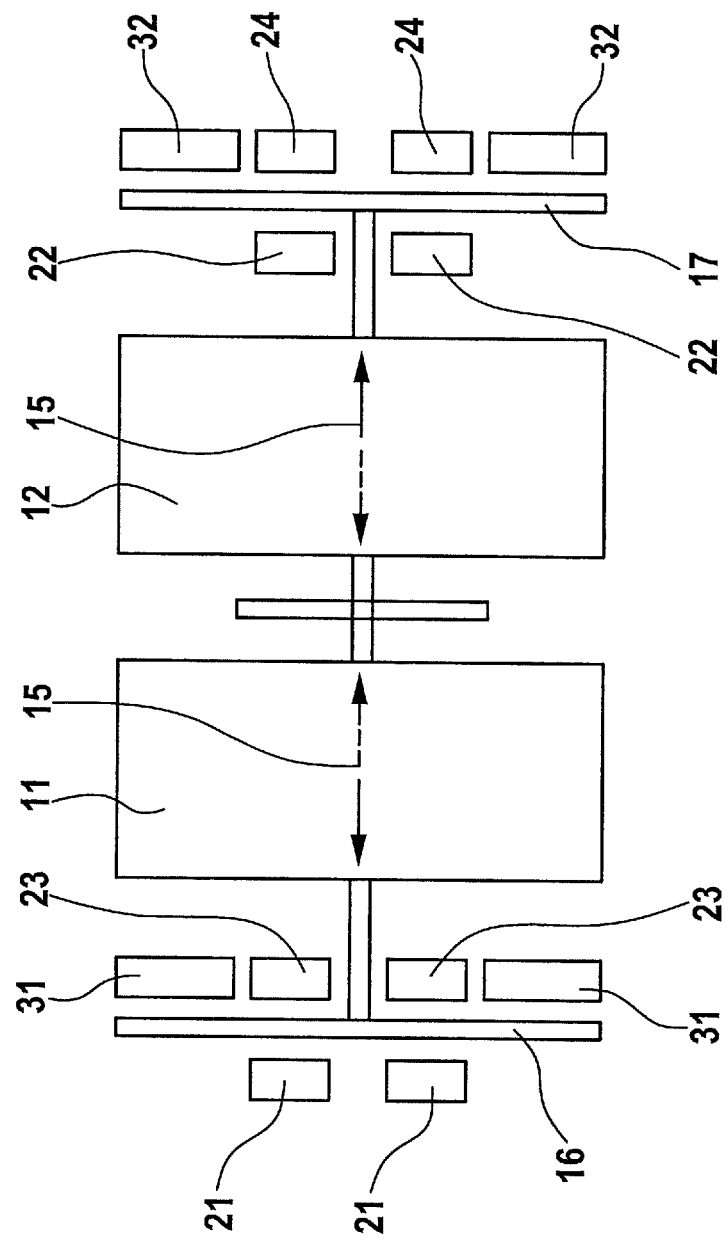
FIG. 5 schematically shows a top view of a micromechanical device, likewise in the form of a yaw rate sensor, according to another specific embodiment of the present invention.

In the specific embodiment of the present invention shown in FIG. 5, first seismic mass 11 is connected to a first drive transmission element 16, and second seismic mass 12 is connected to a second drive transmission element 17, first drive device 21 and first detection device 31 being situated along drive direction 15 on different sides with respect to first drive transmission element 16, and second drive device 22 and second detection device 32 being situated along drive direction 15 on different sides with respect to second drive transmission element 17. As the result of implementing drive transmission elements 16, 17, it is possible for the drive structures to each be externally situated relative to seismic masses 11, 12, i.e., not situated between the seismic masses. Also, as shown in FIG. 5, the drive electrodes (i.e., the first, second, third, and fourth drive devices) are each mounted along drive direction 15 for both orientations (on the drive transmission elements), while first and second detection devices 31, 32 are delimited on only one structure (i.e., first detection device 31 on first seismic mass 11 and second detection device 32 on second seismic mass 12). According to the present invention, this may result in the advantage that the excitation in each case takes place on the drive structure, and parasitic movement patterns are suppressed.

What is claimed is:

1. A method at least one of for operating and measuring a micromechanical device, the micromechanical device having a first seismic mass which is movable by oscillation relative to a substrate, and a second seismic mass which is movable by oscillation relative to the substrate, the micromechanical device having a first drive device to deflect the first seismic mass, and a second drive device to deflect the second seismic mass, in each case in parallel to a drive direction and according to a first orientation, the micromechanical device having a third drive device to deflect the first seismic mass, and a fourth drive device to deflect the second seismic mass in parallel to the drive direction and according to a second orientation opposite from the first orientation, the micromechanical device having a first detection device to detect solely a drive motion of the first seismic mass, the micromechanical device having a second detection device to detect solely a drive motion of the second seismic mass, the method comprising:

generating, by the first detection device, a first detection signal;

generating, by the second detection device, a second detection signal; and evaluating the first detection signal separately from the second detection signal.

2. The method as recited in claim 1, wherein the first drive device and the first detection device are situated along the drive direction on different sides with respect to the first seismic mass, and the second drive device and the second detection device are situated along the drive direction on different sides with respect to the second seismic mass.

3. The method as recited in claim 1, wherein the first seismic mass is connected to a first drive transmission element, and the second seismic mass is connected to a second drive transmission element, the first drive device and the first detection device being situated along the drive direction on different sides with respect to the first drive transmission element, and the second drive device and the second detection device being situated along the drive direction on different sides with respect to the second drive transmission element.

4. The method as recited in claim 1, wherein the first and the second detection signals are detected during a premeasurement as part of a manufacture or characterization process of the micromechanical device.

5. A micromechanical device, comprising:

a first seismic mass;

a second seismic mass;

a first drive device to deflect the first seismic mass, and a second drive device to deflect the second seismic mass, in each case in parallel to a drive direction and according to a first orientation;

a third drive device to deflect the first seismic mass, and a fourth drive device to deflect the second seismic mass in parallel to the drive direction and according to a second orientation opposite from the first orientation;

a first detection device to detect solely a drive motion of the first seismic mass; and a second detection device to detect solely a drive motion of the second seismic mass;

wherein the micromechanical device is configured in such a way that a first detection signal is generated by the first detection device and a second detection signal is generated by the second detection device, the micromechanical device being configured to separately evaluate the first and the second detection signals.

6. The micromechanical device as recited in claim 5, wherein the micromechanical device is a yaw rate sensor.

7. The micromechanical device as recited in claim 5, wherein the first drive device and the first detection device are situated along the drive direction on different sides with respect to the first seismic mass, and the second drive device and the second detection device are situated along the drive direction on different sides with respect to the second seismic mass.

8. The micromechanical device as recited in claim 5, wherein the first seismic mass is connected to a first drive transmission element and the second seismic mass is connected to a second drive transmission element, the first drive device and the first detection device being situated along the drive direction on different sides with respect to the first drive transmission element, and the second drive device and the second detection device being situated along the drive direction on different sides with respect to the second drive transmission element.

9. The micromechanical device as recited in claim 8, wherein the first drive device and the first detection device are situated along the drive direction on the same side with respect to a first substructure including the first seismic mass, and the second drive device and the second detection device are situated along the drive direction on the same side with respect to a second substructure including the second seismic mass.

10. The micromechanical device as recited in claim 5, wherein the first drive device, the third drive device, and the first detection device are each designed as finger electrodes which together with counter electrodes of the first seismic mass form comb structures, and the second drive device, the fourth drive device, and the second detection device are each designed as finger electrodes which together with counter electrodes of the second seismic mass form further comb structures.

* * * * *